United States Patent
Ljung (10) Patent No.: US 9,699,651 B2
(45) Date of Patent: Jul. 4, 2017

(54) METHOD AND NETWORK NODE FOR MANAGING DEVICE-RELATED DATA TO BE DISTRIBUTED TO A COMMUNICATION DEVICE IN A COMMUNICATION NETWORK

(71) Applicant: Telefonaktiebolaget L M Ericsson (publ), Stockholm (SE)

(72) Inventor: Magnus Ljung, Nättraby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 12 days.

(21) Appl. No.: 14/783,919

(22) PCT Filed: Apr. 17, 2013

(86) PCT No.: PCT/SE2013/050419
§ 371 (c)(1),
(2) Date: Oct. 12, 2015

(87) PCT Pub. No.: WO2014/171864
PCT Pub. Date: Oct. 23, 2014

(65) Prior Publication Data
US 2016/0057616 A1    Feb. 25, 2016

(51) Int. Cl.
*H04W 8/26* (2009.01)
*H04W 4/08* (2009.01)
(Continued)

(52) U.S. Cl.
CPC ........... *H04W 8/26* (2013.01); *H04L 41/0886* (2013.01); *H04L 41/12* (2013.01); *H04L 51/20* (2013.01);
(Continued)

(58) Field of Classification Search
CPC ......... H04W 8/26; H04W 4/021; H04W 4/08; H04W 4/001; H04W 48/16;
(Continued)

(56) References Cited

U.S. PATENT DOCUMENTS 7,889,869 B2 * 2/2011 Ypya .................. H04L 41/0253
380/270
2002/0143923 A1 * 10/2002 Alexander ............ H04L 29/06
709/223
(Continued)

FOREIGN PATENT DOCUMENTS

EP     2063681 A1    5/2009
WO    2009152512 A2   12/2009

*Primary Examiner* — Afsar M Qureshi
(74) *Attorney, Agent, or Firm* — Patent Portfolio Builders, PLLC (57) ABSTRACT

The present disclosure relates to a method performed by a network node (110) for managing device-related data to be distributed to a communication device (101, 102, 103, 104) in a communication network. The method comprises receiving (304) location information of the communication device from a presence protocol server (120), wherein the location information is received over a presence protocol, and receiving (306) a device identification for identifying the communication device, wherein the device identification is received over the presence protocol. The method further comprises selecting (308) device-related data for the communication device based on the received device location information, and transmitting (310) the selected device-related data to the communication device according to the received device identification. The present disclosure also relates to a corresponding network node. The present disclosure also relates to a method in a communication device communicating with the network node and to a corresponding communication device.

19 Claims, 8 Drawing Sheets

(51) Int. Cl.
*H04W 4/02* (2009.01)
*H04L 29/08* (2006.01)
*H04L 12/58* (2006.01)
*H04L 12/24* (2006.01)
*H04W 48/16* (2009.01)
*H04W 4/00* (2009.01)

(52) U.S. Cl.
CPC ............. *H04L 67/24* (2013.01); *H04W 4/021* (2013.01); *H04W 4/08* (2013.01); *H04W 48/16* (2013.01); *H04L 67/18* (2013.01); *H04L 67/34* (2013.01); *H04W 4/001* (2013.01)

(58) Field of Classification Search
CPC ..... H04L 41/0886; H04L 41/12; H04L 48/16; H04L 67/18; H04L 67/34
USPC .......................................................... 370/254
See application file for complete search history.

(56) References Cited

U.S. PATENT DOCUMENTS

| | | | |
|---|---|---|---|
| 2006/0217113 A1* | 9/2006 | Rao | H04L 41/0233 455/422.1 |
| 2007/0169093 A1* | 7/2007 | Logan | G06F 8/60 717/168 |
| 2007/0250632 A1* | 10/2007 | Nomura | H04L 63/08 709/227 |
| 2011/0035443 A1 | 2/2011 | Jensen et al. | |
| 2011/0151890 A1 | 6/2011 | Platt et al. | |
| 2011/0196925 A1* | 8/2011 | Hans | G06Q 30/02 709/204 |
| 2011/0200052 A1* | 8/2011 | Mungo | H04L 41/028 370/401 |
| 2011/0314144 A1 | 12/2011 | Goodman | |
| 2012/0315879 A1 | 12/2012 | Vrbaski et al. | |

* cited by examiner

METHOD AND NETWORK NODE FOR MANAGING DEVICE-RELATED DATA TO BE DISTRIBUTED TO A COMMUNICATION DEVICE IN A COMMUNICATION NETWORK

CROSS-REFERENCE TO RELATED APPLICATION

This Application is the U.S. National Stage filing under 35 U.S.C §371 of PCT Application Serial No. PCT/SE2013/050419 filed on Apr. 17, 2013. The disclosure of the PCT Application is herein incorporated by reference in its entirety.

TECHNICAL FIELD

The present disclosure relates generally to a method performed by a network node and a network node configured for managing device-related data to be distributed to a communication device in a communication network. The present disclosure further relates to a method performed by a communication device and a communication device configured for communicating with the network node.

BACKGROUND

Figure 1:
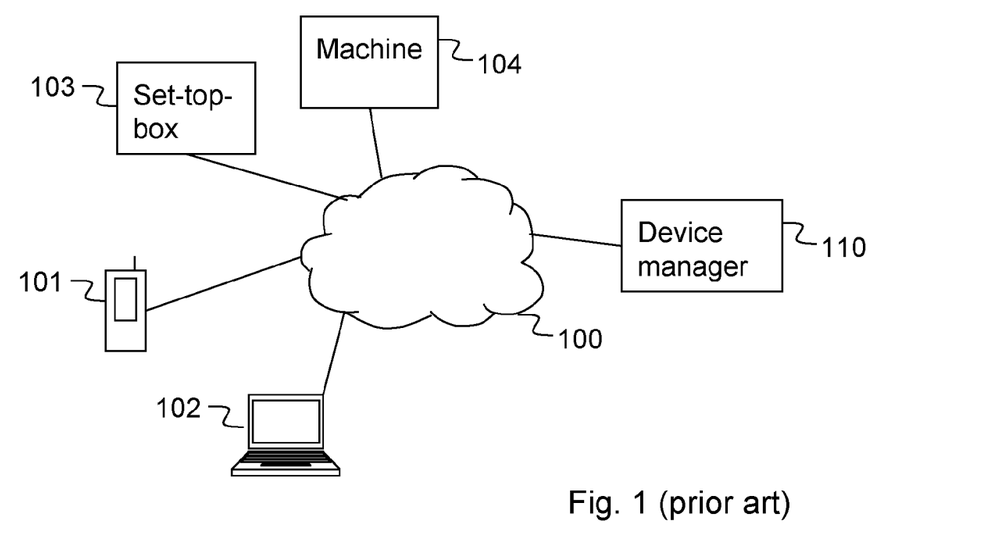
FIG. 1 is a schematic block diagram of a communication network according to prior art.

FIG. 1 shows a communication network comprising an access network 100 to which communication devices 101, 102, 103, 104 can connect. The communication devices may be mobile terminals communicating via a radio access network, or stationary terminals communicating via a wireline access network. Exemplary communication devices are mobile phones 101, laptops or stationary computers 102, set-top-boxes 103 and machine-to-machine, M2M, devices 104. Different network nodes and/or servers may be connected to the access network 100. One such network node is a device manager server 110. The device manager 110 makes it possible to differentiate e.g. device settings to be sent to the communication devices 101, 102, 103, 104 from the device manager based on different groups that a subscriber, or owner, of a communication device belongs to. A subscriber can belong to one or more subscription groups. A subscription group may be limited to for example, subscribers with the same interest, subscribers with the same kind of subscription etc. Information about which subscription group(s) the subscriber belongs to is provisioned into the device manager and the information is coupled to the communication device of the subscriber. The device settings may be distributed to the communication device using a device management protocol.

It may also be of interest to distribute device settings depending on the location of the communication device. However, there is today no efficient solution for using a location of a device to determine what device settings to distribute to a device located in a certain area.

There is a device management protocol called Open Mobile Alliance-Device Management protocol, OMA-DM, specified by the OMA. The OMA-DM protocol is supplemented by Managed Objects, MO, describing how certain objects or devices may be managed over the OMA-DM protocol. One such MO is called Access Network Discovery and Selection Function, ANDSF, MO specified in the 3GPP OMA working group in 3GPP TS 24.312. The ANDSF MO is used for setting policies in a 3GPP mobile device, e.g. cellular phone, regarding which access networks the mobile device is allowed to select. In the ANDSF MO there is also location information which may be a parameter used for setting such policies. The location information is used in the Device manager together with information regarding which services a subscriber of the device is allowed to access according to its subscription to set policies in the device for which networks the device is allowed to access in a certain area. Consequently, different 3GPP devices in a certain geographical area may have different access network selection policies. In other words, the policies are not the same for all devices in a geographical area. Further, The OMA DM protocol is designed for management of mobile devices such as mobile phones, PDAs and palm top computers. In other words, the OMA-DM protocol may only provide location information to the device manager from 3GPP mobile devices.

As shown in FIG. 1, a communication network may comprise different types of communication devices. There is a need for an efficient solution for distributing geographically dependent information, such as device settings, to communication devices in a network, irrespective of the type of communication device.

SUMMARY

It is an object of the invention to address at least some of the problems and issues outlined above. It is another object to facilitate distribution of geographically dependent device-related data, such as device settings, to communication devices in a communication network. It is another object to facilitate distribution of geographically dependent device-related data, such as device settings, to communication devices in a communication network irrespective of the type of communication device. It is possible to achieve these objects and others by using a method and an apparatus as defined in the attached independent claims.

According to a first aspect, a method performed by a network node is provided for managing device-related data to be distributed to a communication device in a communication network. The method comprises receiving location information of the communication device from a presence protocol server, wherein the location information is received over a presence protocol. The method further comprises receiving a device identification for identifying the communication device, wherein the device identification is received over the presence protocol. The method further comprises selecting device-related data for the communication device based on the received device location information. The method further comprises transmitting the selected device-related data to the communication device according to the received device identification.

According to a second aspect, a network node is provided configured for managing device-related data to be distributed to a communication device in a communication network. The network node comprises a receiving unit configured to receive location information of the communication device from a presence protocol server, wherein the location information is received over a presence protocol. The receiving unit is further configured to receive a device identification for identifying the communication device, wherein the device identification is received over the presence protocol. The network node further comprises a selecting unit configured to select device-related data for the communication device based on the received device location information. The network node further comprises a transmitting unit configured to transmit the selected device-related data to the communication device according to the received device identification.

According to a third aspect, a method is provided performed by a communication device for communicating with a network node in a communication network. The method comprises transmitting a device identification to a presence protocol server for identifying the communication device, for further delivery to the network node. The method further comprises transmitting location information of the communication device to a presence protocol server over a presence protocol, for further delivery to the network node. The method further comprises receiving device-related data of the communication device from the network node according to the transmitted device identification. The device-related data has been selected for the communication device based on the transmitted device location information.

According to a fourth aspect, a communication device is provided configured for communicating with a network node in a communication network. The communication device comprises a transmitting unit configured to transmit a device identification to a presence protocol server for identifying the communication device, for further delivery to the network node. The transmitting unit is further configured to transmit location information of the device to a presence protocol server over a presence protocol, for further delivery to the network node. The communication device further comprises a receiving unit configured to receive device-related data of the communication device from the network node according to the device identification. The device-related data has been selected for the communication device based on the transmitted device location information.

According to a fifth aspect, a computer program is provided comprising computer readable code means which when run in a network node causes the network node to perform the steps below. Receiving location information of a communication device from a presence protocol server, wherein the location information is received over a presence protocol. Receiving a device identification for identifying the communication device, wherein the device identification is received over the presence protocol. Selecting device-related data for the communication device based on the received device location information. Transmitting the selected device-related data to the communication device according to the received device identification.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present invention is based on the understanding that by using a presence protocol, such as Extensible Messaging and Presence Protocol, XMPP, and communicating location information of a device and device-ID to a device manager via an XMPP server, it is possible to use the received location information in the device manager to differentiate device-related data for a device geographically, irrespective of which device management protocol that is used by the communication device.

A method for NAT traversal is being specified for a device management protocol called TR-069. This method uses XMPP connection requests. In other words, for using this method for NAT traversal, an XMPP client has been downloaded on the device such that the device can communicate with an XMPP server over an XMPP connection. The invention is based on the idea of using this XMPP connection, or any other similar type of presence protocol, for including a new function using device location information to differentiate device-related data that is to be sent to a device depending on where the device is located geographically.

Figure 2:
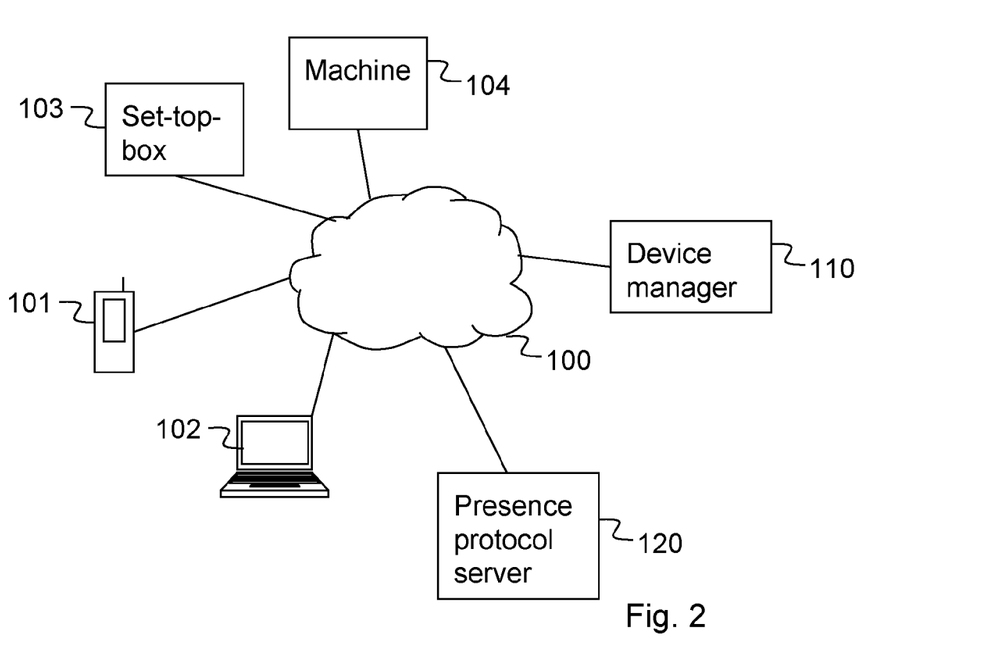
FIG. 2 is a schematic block diagram of an exemplary communication network in which embodiments of the present invention can be used.

FIG. 2 is a communication network similar to the communication network described in relation to FIG. 1. In addition to the nodes and devices shown in FIG. 1, this communication network also comprises a presence protocol server 120, which may be an XMPP server. For being able to communicate with the presence protocol server 120, each of the communication devices 101, 102, 103, 104 are equipped with a presence protocol client. When the presence protocol server is an XMPP server, the present protocol clients are XMPP clients.

Figure 3:
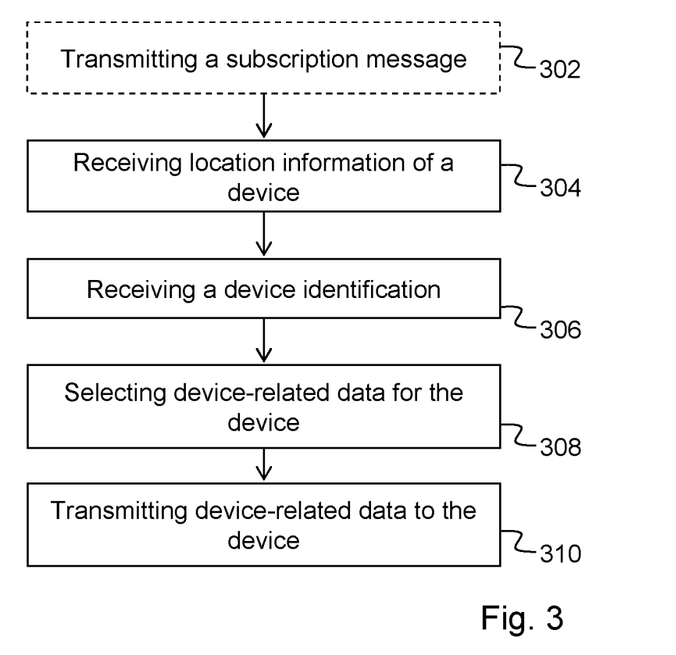
FIG. 3 is a flow chart illustrating a method in a network node according to possible embodiments.

FIG. 3 describes a method according to an embodiment, performed by a network node 110 for managing device-related data to be distributed to a communication device 101, 102, 103, 104 in a communication network. The method comprises receiving 604 location information of the communication device from a presence protocol server 120, wherein the location information is received over a presence protocol. The method further comprises receiving 606 a device identification for identifying the communication device. The device identification may be received over the presence protocol. The method further comprises selecting 608 device-related data for the communication device based on the received device location information. The method further comprises transmitting 610 the selected device-related data to the communication device according to the received device identification.

Device-related data may be e.g. a configuration rule, a software update, an application or device settings that should be provisioned to the communication device or devices of the subscriber. Device-related data selected based on the received device location information may also be called location-specific device-related data. Location-specific device-related data is such data that may differ depending on the location of the device. Location-specific device-related data may be common for all devices in a defined geographical area.

A device identification may be an identification of a device as opposed to e.g. a user ID which is an identification of a user that may use many different types of devices.

The network node may be a device managing node, such as a device manager. The device managing node is arranged to provide devices with different device-related data such as device settings.

By receiving a device identification, it is possible for the network node to identify the communication device. Thereby, it is possible for the network node to communicate with the device over the network node communication protocol used by the network node, irrespective of the used network node communication protocol. By also receiving location information connected to the device identification enables the network node to determine the device-related data of a specific device depending on where it is located. The received device identification then makes it possible for the network node to contact the communication device over the network node communication protocol. The device identification (and the device location information) is made available to the network node by the aid of the presence protocol.

The received device location information may be connected to the received device identification by e.g. being sent in the same message. Alternatively, if the location information and the device identification are sent in separate messages, any of the separate messages may have a pointer pointing towards the other message such that the received location information is connected to the received device identification.

According to an embodiment, the device-related data is transmitted 310 to the communication device over a device management protocol. Thus, the location information and the device identification are received from a presence server over a presence protocol whereas the device-related data is transmitted to the device via a device management protocol. Thereby any device management protocol may be used. Consequently, the method is independent of the used device management protocol. Different device management protocols that may be used are OMA-DM, TR-69, Open Mobile Alliance-Client Provisioning, OMA-CP, Device Language Message Specification/Companion Specification for Energy Metering, DLMS/COSEM, which is a Machine to Machine, M2M, protocol.

According to an embodiment, the presence protocol server 120 is an XMPP server, and the presence protocol is XMPP. XMPP is a suitable protocol since it has an extension that specifies a format for exchanging location information. The extension is called XMPP Extension Protocol 0080, XEP-0080. Further, XMPP enables exchange of relatively small pieces of structured data over a network between any two or more entities. XMPP makes it possible to connect a communication device and a network node to each other via an XMPP server, which network node and communication device cannot communicate directly with each other.

According to an embodiment, the received device identification is a presence protocol device identification. Further, the method comprises determining a network node device identification based on the received presence-protocol device identification. Thereafter, the transmitting of device-related data to the communication device is performed according to the determined network node device identification.

The presence protocol device identification is a device identification used over the presence protocol for identifying the device. The network node device identification is a device identification used in the network node for identifying the device. The network node device identification may be a device management protocol device identification. The device management protocol device identification is a device identification used over the device management protocol for identifying the device. The network node may transmit the selected device-related data to the communication device using the determined network node device identification.

By the network node determining a network node device identification based on the received presence protocol device identification, sending of device-related data to a device depending on its geographical position is realized for a communication network that uses a different device identification in the presence protocol and in the network node. The determining may be performed by analyzing a mapping table that has been pre-populated with a mapping between the presence protocol device identification for the device and the network node device identification for the same device. The mapping table may be stored in a storage unit of the network node. The presence protocol device identification may be configured such that the username part of the presence protocol identification corresponds to the network node device identification.

According to an embodiment, the method may further comprise transmitting 302 a subscription message to the presence protocol server for subscribing to location information for the device.

By transmitting a subscription message to the presence protocol server, the network node will enable to receive a message from the presence protocol server with device location information according to a predefined subscription scheme. For example, the network node may receive a message every time the presence protocol server receives new location information for the device or every time the location information has changed.

According to another embodiment, the location information of the communication device received from the protocol server originates from the communication device.

Thereby it is enabled to cater for device location information originating from the communication device. It is also possible to use network based location information, wherein the device location information originates from the network, e.g. in a location server of the network, instead of originating from the communication device.

Figure 4:
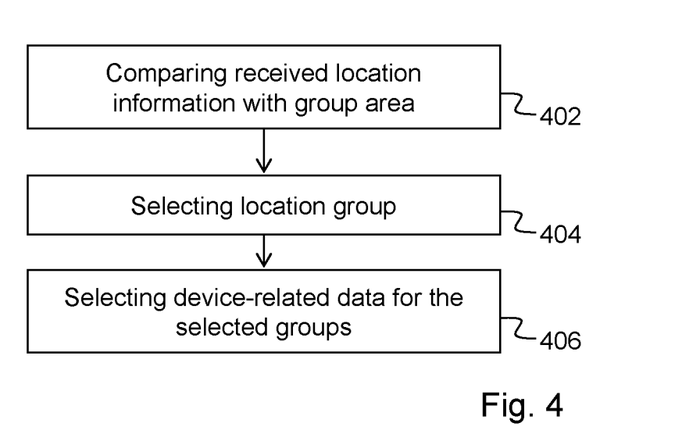
FIG. 4 is a flow chart illustrating another method in a network node according to possible embodiments.

FIG. 4 shows an embodiment of the step of selecting 308 device-related data to the device based on the received device location information. According to this embodiment, a number of location groups are defined, each location group being connected with geographical information defining a certain geographical area. Device-related data is connected to each location group. The step of selecting 308 device-related data comprises comparing 402 the received device location information with the geographical information connected with each location group. The step of selecting 308 device-related data further comprises selecting 704 the location group or groups of the number of location groups for which the geographical information matches the device location information. The step of selecting 308 device-related data further comprises selecting 406 the device-related data for the selected location group or groups.

The geographical area defined by a location group of the number of location groups is different to the geographical area defined by any other location group of the number of location groups. However, the different defined geographical areas may overlap each other.

By such a procedure it is enabled to connect device-related data to different location groups and to connect received device location information to the device-related data valid for a location group covering the device location information. By the aid of the device identification the valid device-related data is transmitted to the device. A device location information may be valid for more than one group. In other words, the groups may be hierarchical.

The geographical information defining a certain geographical area may be a geographical area, e.g. polygon or cell, street address, a certain building or buildings, and/or geographic related information such as speed, height etc.

Figure 5:
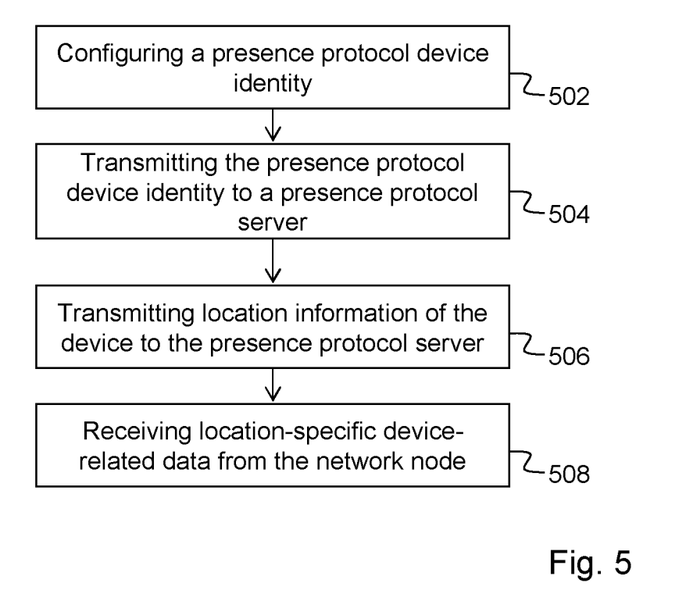
FIG. 5 is a flow chart illustrating a method in a communication device according to possible embodiments.

FIG. 5 shows a flow chart of a method performed by a communication device 101, 102, 103, 104 for communicating with a network node 110 as described in relation to the method of FIGS. 3 and 4. The method comprises transmitting 504 a device identification to a presence protocol server 120 over a presence protocol for identifying the communication device, for further delivery to the network node. The method further comprises transmitting 506 location information of the device to a presence protocol server 120 over the presence protocol, for further delivery to the network node. The method further comprises receiving 508 device-related data of the communication device from the network node according to the transmitted device identification, wherein the device-related data has been selected for the communication device based on the transmitted device location information.

By the communication device transmitting a device identification and location information over a presence protocol it is possible for a network node, such as a device manager, to identify the communication device and to locate the communication device Further, by receiving device-related data from the network node, communication with the network node is enabled, for receiving device-related data that has been selected for the communication device based on the transmitted device location information and the transmitted device identification.

According to an embodiment, the location-specific data is received 508 over a device management protocol. Thus, the location information and the device identification are transmitted to a presence server over a presence protocol for further delivery to the network node whereas the device-related data is received from the network node via a device management protocol. Thereby any device management protocol may be used. Consequently, the method is independent of the used device management protocol.

According to an embodiment, the presence protocol server 120 is an Extensible Messaging and Presence Protocol, XMPP, server, and the presence protocol is XMPP.

According to another embodiment, the communication device is equipped with a presence protocol client 1008. Further, the device identification may be a presence protocol device identification. The method may further comprise configuring 502 the presence protocol client with the presence protocol device identification, which presence protocol device identification corresponds to a network node device identification used at the network node. Thereby it is enabled to communicate the presence protocol device identification over the presence protocol and for the network node to map the presence protocol device identification to the network node device identification.

Figure 6:
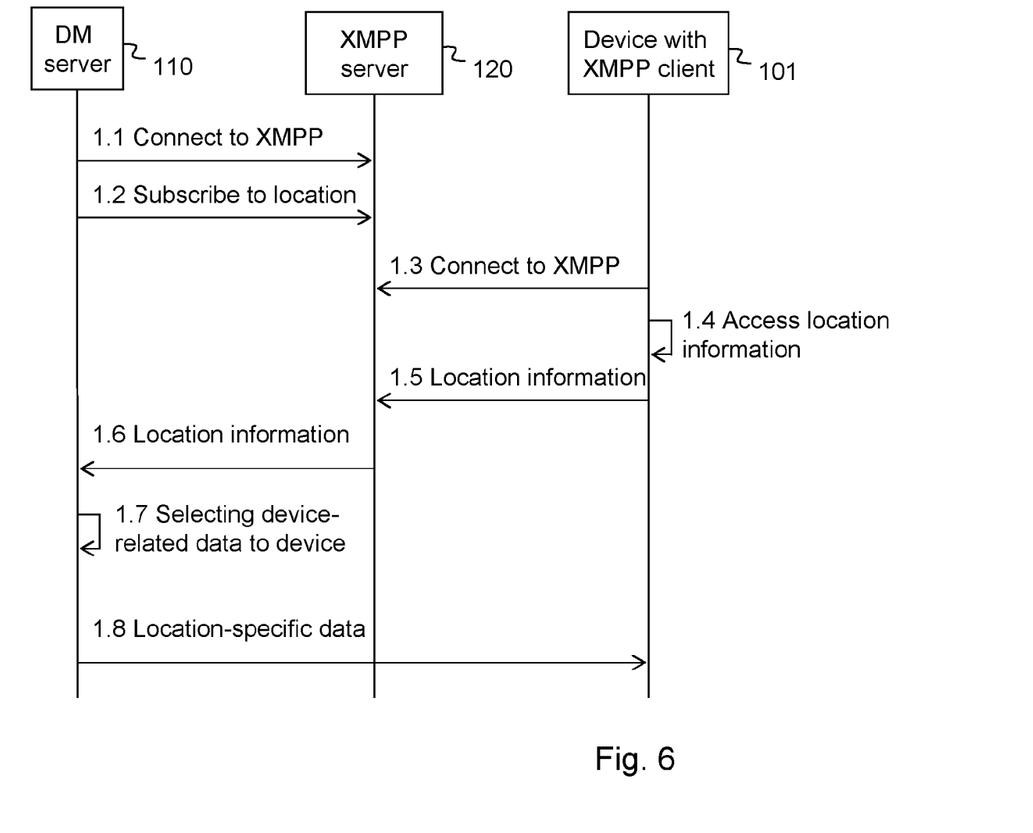
FIG. 6 is a signaling diagram illustrating an example of a procedure according to possible embodiments

As mentioned, the presence protocol may be XMPP. The purpose of XMPP is to enable exchange of relatively small pieces of structured data, called "XML stanzas", over a communication network between any two, or more, entities. XMPP is typically implemented using a distributed client-server architecture, wherein a client needs to connect to a server in order to gain access to the communication network and thus be allowed to exchange XML stanzas with other entities, which can be associated with other servers. The process whereby a client connects to a server, exchanges XML stanzas, and ends the connection is:

1. Determine the IP address and port at which to connect, typically based on resolution of a fully qualified domain name
2. Open a Transmission Control Protocol, TCP, connection
3. Open an XML stream over TCP
4. Preferably negotiate Transport Layer Security, TLS, for channel encryption
5. Authenticate using a Simple Authentication and Security Layer, SASL, mechanism
6. Bind a resource to the stream
7. Exchange an unbounded number of XML stanzas with other entities on the network
8. Close the XML stream
9. Close the TCP connection FIG. 6 is a signaling diagram describing the actions performed according to an embodiment, wherein a communication device 101 is equipped with an XMPP client for communicating over XMPP with an XMPP server 120. The XMPP server 120 is also arranged for communicating over XMPP with a device management, DM, server 110. The device management server 110 is capable of communicating over XMPP with the XMPP server 120 and capable of communicating over a device management protocol with the communication device 101.

Before the signaling is performed, a number of location groups are configured in the DM server 110. Each location group is connected with geographical information defining a certain geographical area. A communication device 101 is to become a member of a location group if the device location information matches the geographical information of the group. Location groups may have a geographical hierarchy, such that one location group covers a large geographical area in which there are other smaller geographical areas defined by other location groups. For example, one location group may be defined as a country, e.g. "Sweden". Another location group on another hierarchical level may be defined as a city in the country, e.g. "Karlskrona", which is a city in Sweden. Another location group on yet another hierarchical level may be defined as a hot spot in Karlskrona. Consequently, device location information may match a plurality of groups, for example the hot spot in Karlskrona, "Karlskrona" and "Sweden".

Further, before signaling is performed, if not already performed, the DM server 110 establishes a connection with the XMPP server 120. Further, if a new communication device is detected that is not already equipped with an XMPP client; the DM server 110 downloads the XMPP client application to the device using normal device management procedures. The new communication device may be detected via for example a network based device detection method or a device management protocol. Further, the XMPP client of the communication device 101 is configured with an XMPP identity (also called presence protocol device identification) so that the username part of the XMPP identity corresponds to the device identifier in the device management system (also called network node device identification). For a communication device communicating according to TR-069, an example XMPP identity may be OUI-ProductClass-Serial@dm.example.com, for a mobile communication device an example XMPP identity may be IMEI@dm.example.com. The username part of the XMPP identity is the part expressed before the @ sign.

Looking at FIG. 6 again, an exemplary signaling procedure starts by the DM server 110 establishing 1.1 an XMPP connection with the XMPP server 120. A possible way to exchange location information is by using a Publish-Subscribe mechanism as specified in XMPP Extension Protocol XEP-0060. This publish-subscribe mechanism will be described below. However, other ways to exchange location information may be used as well. The DM server 110 subscribes 1.2 to the device location information. The subscription may be performed by sending the following XMPP stanza to the XMPP server:

```
<iq type='set'
   from='managementserver@devicemanagement.com/location'
   to='pubsub.devicemanagement.com
   id='sub1'>
   <pubsub xmlns='http://jabber.org/protocol/pubsub'>
      <subscribe
         node='device_location'
         jid="managementserver@devicemanagement.com '/>
   </pubsub>
</iq>
```

The XMPP server 120 replies with acknowledgment or not acknowledgement (not shown). The communication device 101 then establishes 1.3 a connection to the XMPP server 120, if not already performed. The communication device 101 accesses 1.4 location information from a location provider in the communication device, e.g. a GPS device or location information such as cell-ID for a mobile device. According to another embodiment, the communication device may receive a location, for example a street address as a Dynamic Host Configuration Protocol, DHCP, option when receiving its IP address. This may be useable especially for a fixed communication device. The DHCP server may find out the address to which the (fixed) device has connected and send the address back to the device as a DHCP option.

The communication device 101, or the XMPP client on the communication device, then starts to report 1.5 the location information to the XMPP server 120, together with its device identification. The communication device may report its location information to the XMPP server 120 at regular intervals or when a triggering condition is met. A triggering condition may be e.g. when the communication device enters or exits a defined area, exceeds a certain speed etc. According to the XEP-0060 Publish-Subscribe mechanism, the XMPP client on the communication device 101 may report the location information by publishing the location information on the "device_location" node by sending e.g. the following XMPP stanza to the XMPP server 120:

```
<iq from='[DeviceID]@devicemanagement.com'
   to='pubsub.devicemanagement.com '
   type='set'
   id='publish1'>
```

```
   <pubsub xmlns='http://jabber.org/protocol/pubsub'>
      <publish node='device_location'>
         <item>
            <geoloc xmlns='http://jabber.org/protocol/geoloc'
               xml:lang='en'>
               <accuracy>20</accuracy>
               <country>Italy</country>
               <lat>45.44</lat>
               <locality>Venice</locality>
               <lon>12.33</lon>
            </geoloc>
         </item>
      </publish>
   </pubsub>
</iq>
```

The DM server 110 then receives 1.6 the location information in a notification sent from the XMPP server 120, together with the device identification. According to the XEP-0060 Publish-Subscribe mechanism, the following XMPP stanza may be received at the DM server 110 from the XMPP server 120:

```
<message from='pubsub.devicemanagement.com'
   to='managementserver@devicemanagement.com'>
   <event xmlns='http://jabber.org/protocol/pubsub#event'>
      <items node='device_location'>
         <item id='d81a52b8-0f9c-11dc-9bc8-001143d5d5db'
               publisher='[DeviceID]@devicemanagement.com'>
            <geoloc xmlns='http://jabber.org/protocol/geoloc'
               xml:lang='en'>
               <accuracy>20</accuracy>
               <country>Italy</country>
               <lat>45.44</lat>
               <locality>Venice</locality>
               <lon>12.33</lon>
            </geoloc>
         </item>
      </items>
   </event>
</message>
```

Thereafter the DM server 110 selects 1.7 device-related data to send to the device based on the received location information. This may be performed by matching the received location information with the geographical information of each location group. The DM server then transmits 1.8 the location-specific data directly to the communication device 101 using the received device identification.

Figure 7:
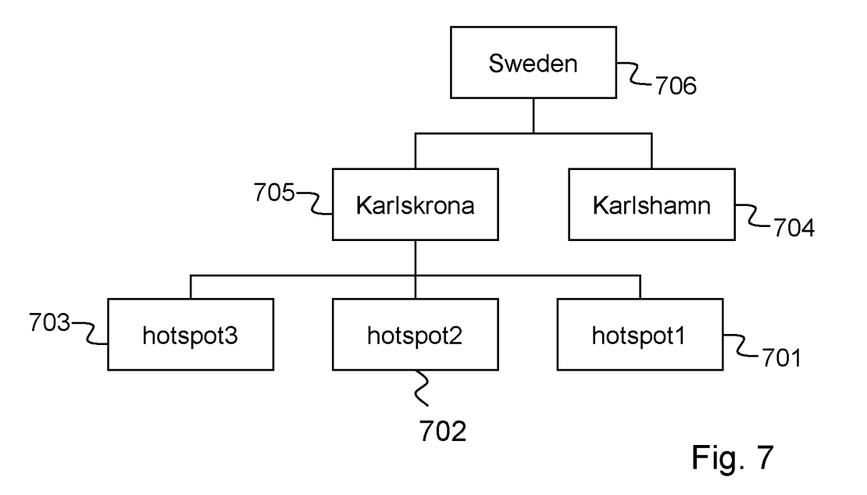
FIG. 7 is a schematic block diagram of a hierarchical location group system according to an embodiment.

FIG. 7 shows an example of a hierarchical group system. A hierarchy of location groups may be defined for the communication network, meaning that one location group is geographically larger than groups on a lower level such that the larger group covers the geographical area of more than one group. This may lead to that when a communication device reports location information, the communication device becomes member of more than one group. In the exemplary group system of FIG. 7, a first level of location groups comprising groups "hotspot1" 701, "hotspot2" 702, "hotspot3" 703, a second level of location groups "Karlskrona" 704 and "Karlshamn" 705 (which are cities in Sweden), and a third level of location groups "Sweden" 706 are shown. The groups "hotspot1" 701, "hotspot2" 702, "hotspot3" 703 are connected to the location group "Karlskrona" and "Karlskrona" is in turn connected to the location group "Sweden". This means that a communication device can, when it becomes a direct member of group "hotspot1" also become an indirect member of group "Karlskrona" and of group "Sweden". Then all device-related data attached to these groups, such as configuration rules, will apply for the communication device.

Figure 8:
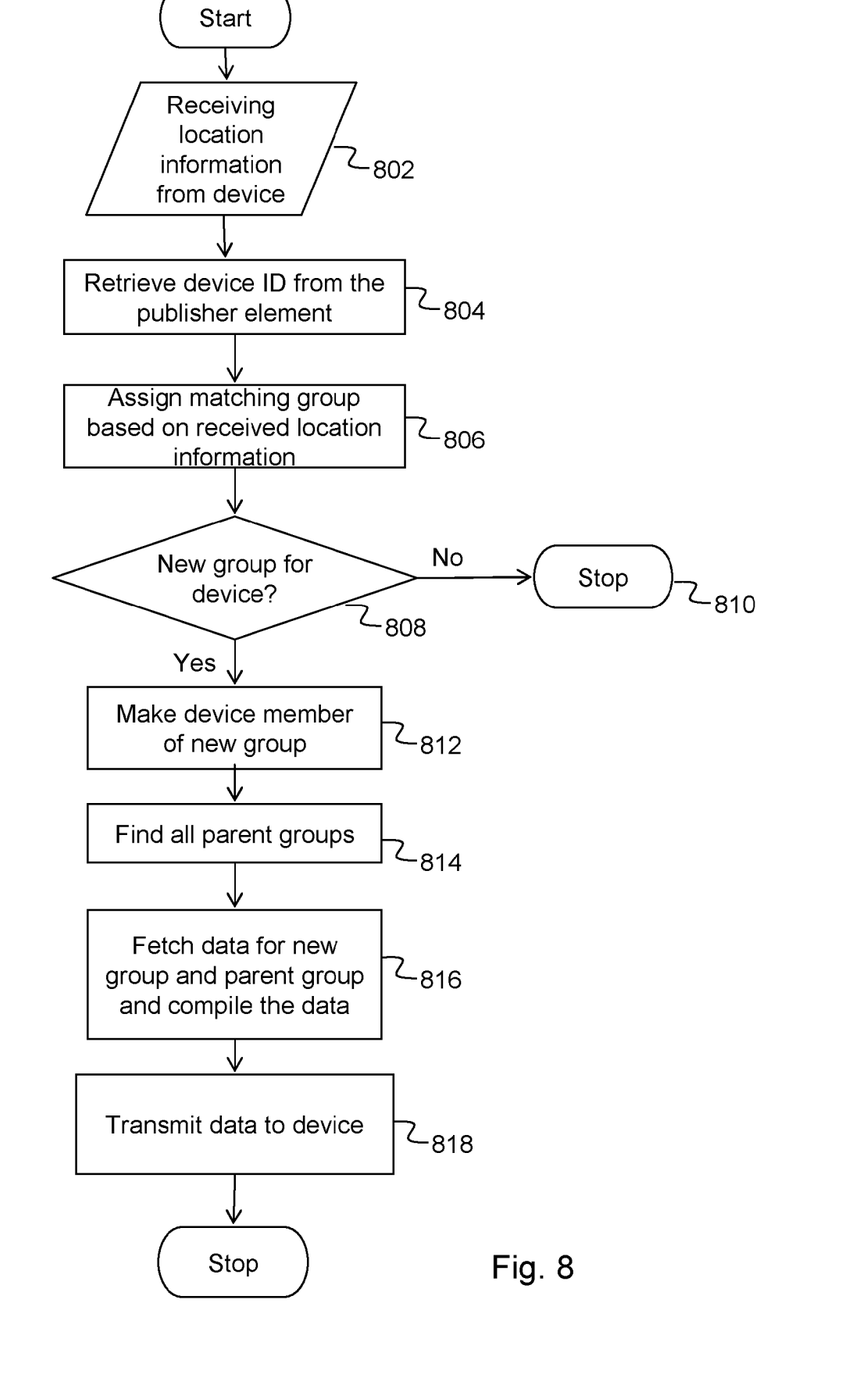
FIG. 8 is a flow chart illustrating another method in a network node according to possible embodiments

FIG. 8 is a flow chart describing an exemplary method in a DM server 110 for managing device-related data to be distributed to a communication device. In the example, the XEP-0060 is used for the communication over the presence protocol. The method starts by receiving 802 location information from the communication device, in a notification sent by the XMPP server to the DM server. The device ID is retrieved 804 from the publisher element of the notification. Thereafter the DM server assigns 806 the device identification to the correct group/groups by matching the location information received from the XMPP server and the geographical information defined for each defined location group.

Then it is checked 808 if any of the groups is new to the device, i.e. if the device was already a member of the group or not. If there is no new group, the procedure may end 810. However, in other embodiments, for example if the device-related data has changed since last update, device-related data may be sent also for groups in which the device is already a member.

If there is a new group, the device becomes 812 a member of that group. Further, all groups on a higher hierarchical level is found 814. If any of the groups on a higher hierarchical level is new, the device becomes a member also of those groups. Thereafter, device-related data for all new groups are fetched 816 and the data is compiled. The compiled data is then transmitted 818 to the communication device using the device identification.

According to an embodiment, if the reported location information leads to that the communication device is allocated to one or more new groups then the device-related data such as configuration policies connected to these groups will be applied to the communication device. This could mean that both new configuration and new software is sent to the communication device. It could also mean that some other management action, e.g. executing diagnostic tests, is performed. For example, in the network of FIG. 7, if a communication device becomes a member of "hotspot1" 701, the Wi-Fi parameters for the hotspot 701 could be set and transmitted to the communication device due to the membership to group "hotspot1". But since the communication device then also becomes a member of the higher hierarchical level location group "Karlskrona" 705, a Karlskrona city guide application software may be downloaded to the communication device. Further, since the communication device then also becomes a member of the higher hierarchical level location group "Sweden" 706, a general Sweden configuration rule such as to set a time zone parameter to Swedish time zone may be applied.

The configuration of the communication device itself could also be part of the configuration policies for the different location groups. Also configuration about the frequency for how often the communication device should publish its location information could be changed due to the new location group assignment.

According to another embodiment, the DM server may configure the communication device with geographical information of location areas such that the communication device can compare its current location information with the geographical information of location areas and determine if the communication device should publish new location information.

According to another embodiment, the communication device may also configure what should trigger the communication device to publish new location information, e.g. to publish location information at specified intervals, to publish location information when entering a new geographic area, to publish location information when exceeding a certain speed etc. All of the above things can be provisioned in the XMPP client remotely from the DM server by for instance using ad-hoc commands defined in XEP-0009, which defines an XMPP protocol extension for transporting Extensible Markup Language Remote Procedure Calls, XML-RPC, encoded requests and responses between two XMPP entities.

Alternatively, XEP-0050 may be used. For this reason XMPP may be needed to implement in the DM server as a device management protocol.

According to another embodiment, illustrated by the exemplary hierarchical group system of FIG. 7, a policy rule can be connected to group "hotspot1" 701 so that the geographical areas for "hotspot2" 702 and "hotspot3" 703 is sent to the communication device together with a policy instructing the communication device to publish its location when entering one of these areas. This requires more logic in the communication device but will offload the access network and the DM/XMPP server since the communication device will not have to publish its location frequently.

Figure 9:
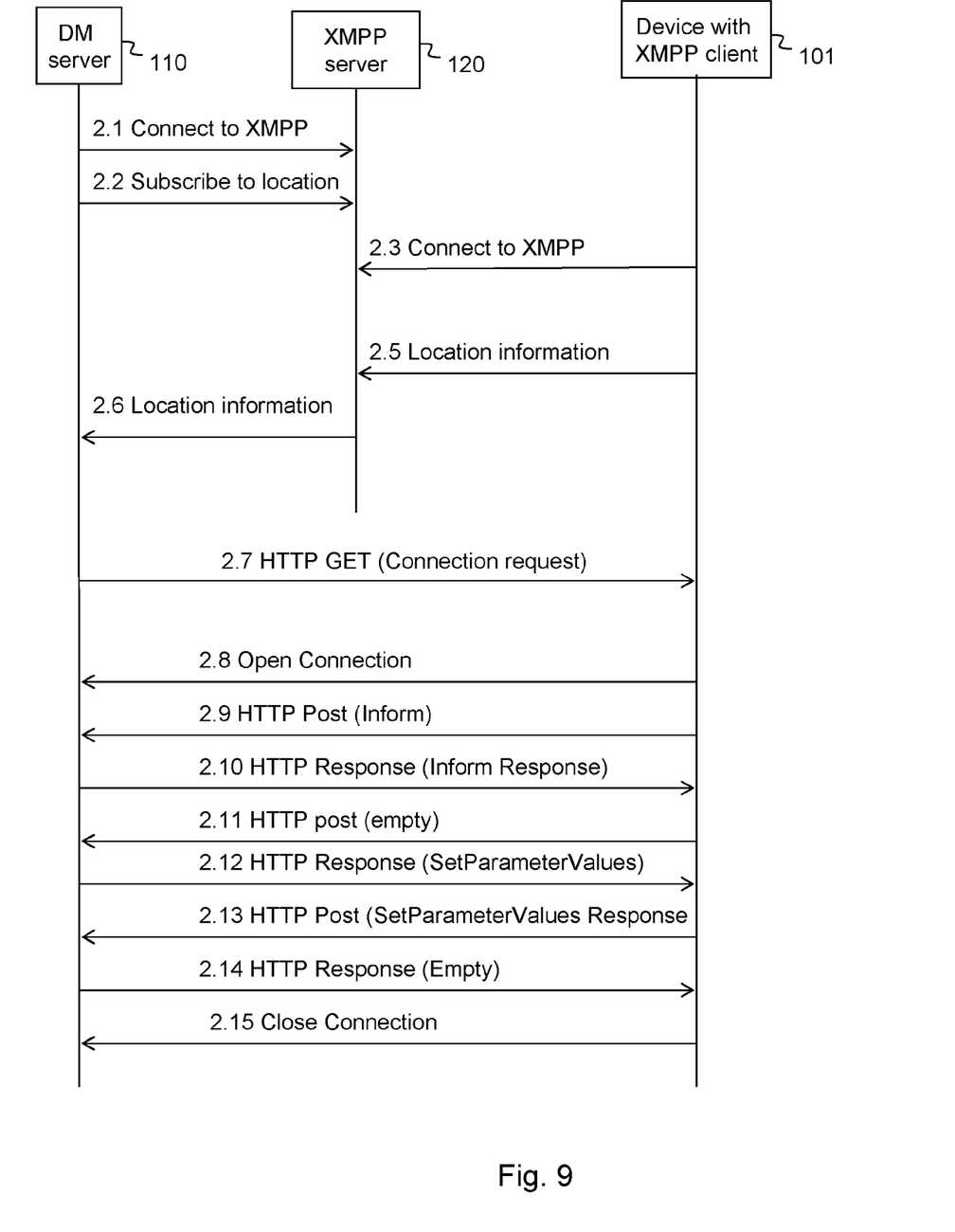
FIG. 9 is another signaling diagram illustrating an example of a procedure when the solution is used when device management protocol TR-069 is used, according to possible embodiments.

FIG. 9 shows a signaling diagram according to an embodiment of the invention in which TR-069 messages are shown for sending messages between the communication device 101 and the DM server 110 after device location information and device identification have been transmitted from the device 101 to the DM server 110 via the XMPP server 120. Consequently, after location information has been received at the DM server, a connection is established between the DM server 110 and the communication device 101. The connection may be established for example using HTTP, by sending an HTTP GET message 2.7 to an address of the communication device. When the device receives the HTTP GET message 2.7 it will establish, or open, a connection 2.8 towards the DM server. In another alternative the connection may be established using XMPP messages communicated between the communication device and the DM server. After the connection has been opened, a HTTP post (inform) 2.9 is sent, informing the DM server of which device that has opened the connection. Thereafter, the DM server acknowledges the HTTP post (inform) in a HTTP Response 2.10. After an empty post 2.11 from the device informing that it has no operation for the DM server, the DM server sends 2.12 a set of parameter values, e.g. configuration parameters to the device. The device acknowledges 2.13. The DM server then sends an empty HTTP response 2.14 informing that the DM server has no more operations to the device, and, as a result, the device closes 2.15 the connection.

Figure 10:
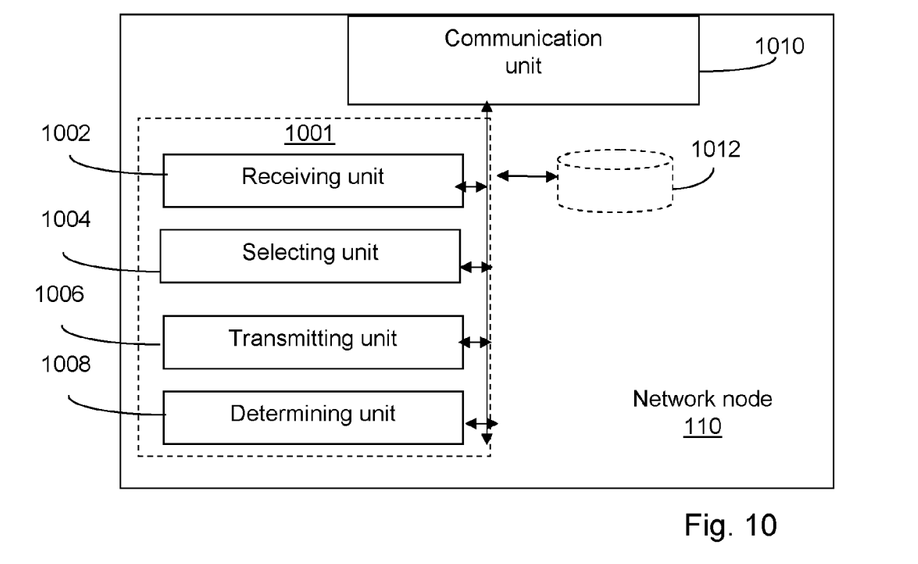
FIG. 10 is a block diagram illustrating a network node in more detail, according to possible embodiments.

FIG. 10 shows a network node 110 configured for managing device-related data to be distributed to a communication device in a communication network. The network node comprises a receiving unit 1002 configured to receive location information of the communication device from a presence protocol server 120. The location information is received over a presence protocol. The receiving unit 1002 is further configured to receive a device identification for identifying the communication device. The device identification is received over the presence protocol. The network node further comprises a selecting unit 1004 configured to select device-related data for the communication device based on the received device location information. The network node further comprises a transmitting unit 1006 configured to transmit the selected device-related data to the communication device according to the received device identification. The network node 110 may be a device management server.

The network node 110 may further comprise a communication unit 1010, which may be considered to comprise conventional means for communication from and/or to other nodes of the network. The network node 110 may further comprise one or more storage units or memories 1012.

According to an embodiment, the transmitting unit 1006 is configured to transmit the device-related data to the communication device over a device management protocol.

According to another embodiment, the presence protocol server 120 is an Extensible Messaging and Presence Protocol, XMPP, server, and the presence protocol is XMPP.

According to another embodiment, the received device identification is a presence-protocol device identification. Further, the network node comprises a determining unit 1008 configured to determine a network node device identification based on the received presence-protocol device identification. Further, the transmitting unit 1006 is configured to transmit device-related data to the communication device according to the determined network node device identification.

According to another embodiment, a number of location groups are defined, each location group being connected with geographical information defining a certain geographical area, and device-related data is connected to each location group. Further, the selecting unit 1004 being configured to select device-related data for the communication device based on the received device location information implies that the selecting unit 1004 is arranged to compare the received device location information with the geographical information connected with each location group, select the location group or groups of the number of location groups for which the geographical information matches the device location information, and select the device-related data for the selected location group or groups.

According to another embodiment, the transmitting unit 1006 is further arranged to transmit a subscription message to the presence protocol server for subscribing to location information for the communication device.

According to another embodiment the location information of the communication device received by the receiving unit 1002 from the protocol server originates from the communication device.

The receiving unit 1002, the selecting unit 1004, the transmitting unit 1006 and the determining unit 1008 may be arranged in an arrangement 1001. The arrangement 1001 could be implemented e.g. by one or more of: a processor or a micro processor and adequate software and storage therefore, a Programmable Logic Device, PLD, or other electronic component(s)/processing circuit(s) configured to perform the actions, or methods, mentioned above.

Figure 11:
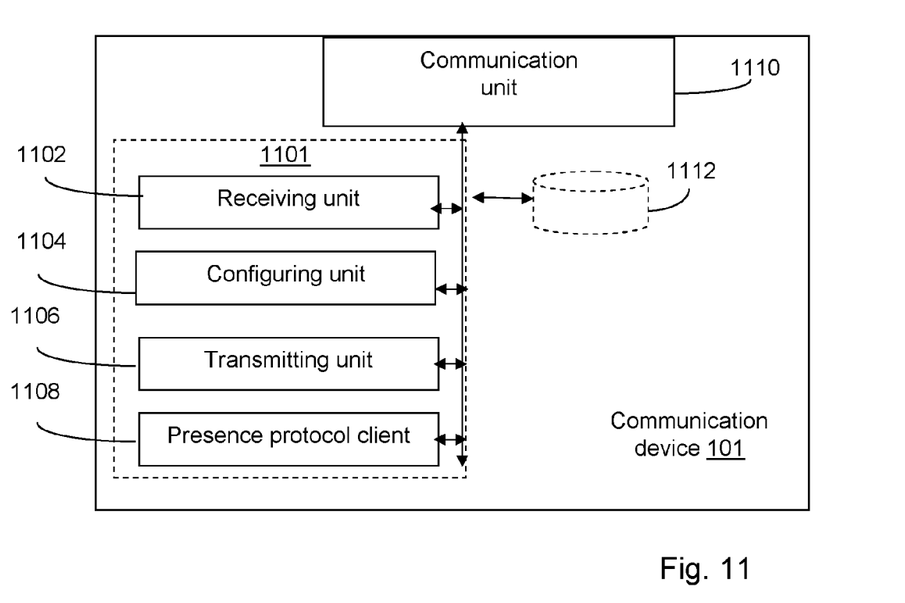
FIG. 11 is a block diagram illustrating a communication device in more detail, according to further possible embodiments.

FIG. 11 shows a communication device 101 configured for communicating with a network node in a communication network. The communication device 101 comprises a transmitting unit 1106 configured to transmit a device identification to a presence protocol server for identifying the communication device, for further delivery to the network node. The transmitting unit 1106 is further configured to transmit location information of the device to a presence protocol server over a presence protocol, for further delivery to the network node. The communication device 101 further comprises a receiving unit 1102 configured to receive device-related data of the communication device from the network node according to the device identification, wherein the device-related data has been selected for the communication device based on the transmitted device location information.

The communication device 101 may further comprise a communication unit 1110, which may be considered to comprise conventional means for communication from and/or to other nodes of the network. The communication device 101 may further comprise one or more storage units or memories 1112

According to an embodiment, the receiving unit 1102 is configured to receive the location-specific data over a device management protocol.

According to another embodiment, the presence protocol server is an Extensible Messaging and Presence Protocol, XMPP, server, and the presence protocol is XMPP.

According to an embodiment the communication device further comprises a presence protocol client 1108. Further, the device identification is a presence protocol device identification. The communication device further comprises a configuring unit 1104 for configuring the presence protocol client 1108 with the presence protocol device identification, which presence protocol device identification corresponds to a network node device identification used at the network node.

The receiving unit 1102, the configuring unit 1104, the transmitting unit 1106 and the presence protocol client 1108 may be arranged in an arrangement 1001. The arrangement 1101 could be implemented e.g. by one or more of: a processor or a micro processor and adequate software and storage therefore, a Programmable Logic Device, PLD, or other electronic component(s)/processing circuit(s) configured to perform the actions, or methods, mentioned above.

Figure 12:
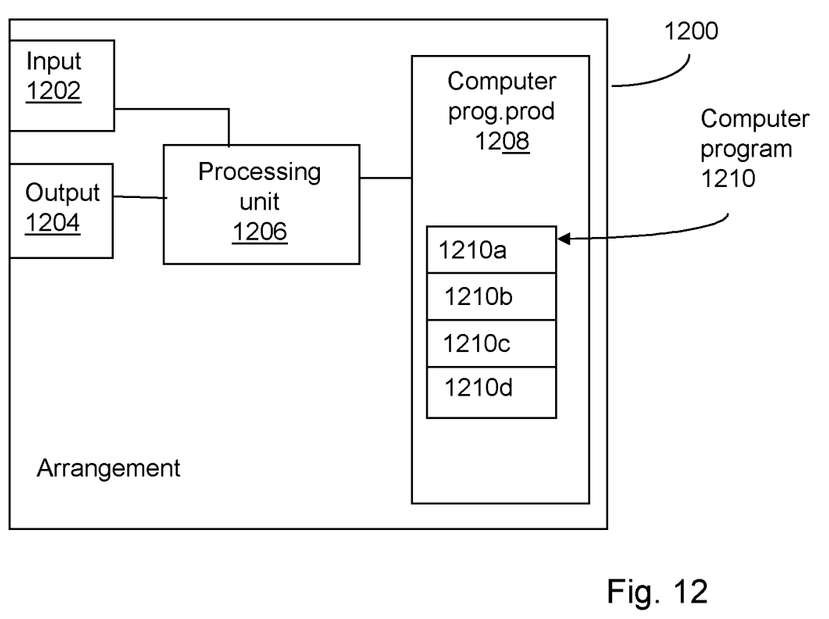
FIG. 12 is a schematic block diagram illustrating an arrangement in more detail, according to further possible embodiments.

FIG. 12 schematically shows an embodiment of an arrangement 1200 for use in a network node 110, which also can be an alternative way of disclosing an embodiment of the arrangement 1001 in a network node 110 illustrated in FIG. 10. Comprised in the arrangement 1200 is a processing unit 1206, e.g. with a Digital Signal Processor (DSP). The processing unit 1206 may be a single unit or a plurality of units to perform different actions of procedures described herein. The arrangement 1200 may also comprise an input unit 1202 for receiving signals from other entities, and an output unit 1204 for providing signal(s) to other entities. The input unit 1202 and the output unit 1204 may be arranged as an integrated entity.

Furthermore, the arrangement 1200 comprises at least one computer program product 1208 in the form of a non-volatile or volatile memory, e.g. an Electrically Erasable Programmable Read-only Memory (EEPROM), a flash memory, a disk drive or a Random-access memory (RAM). The computer program product 1208 comprises a computer program 1210, which comprises code means, which when executed in the processing unit 1206 in the arrangement 1200 causes the arrangement 1001 and/or the network node 110 to perform the actions of any of the procedures described earlier in conjunction with FIG. 10.

The computer program 910 may be configured as a computer program code structured in computer program modules. Hence, in an exemplifying embodiment, the code means in the computer program 1210 of the arrangement 1200 comprises a first receiving module 1210*a* for receiving location information of a communication device from a presence protocol server 120, wherein the location information is received over a presence protocol. The code means further comprises a second receiving module 1210*b* for receiving a device identification for identifying the communication device, wherein the device identification is received over the presence protocol. The code means further comprises a selecting module 1210c for selecting device-related data for the communication device based on the received device location information. The code means further comprises a transmitting module 1210d for transmitting the selected device-related data to the communication device according to the received device identification.

The acts which have above been described as being implemented or executed by a processor may be performed by any suitable machine. The machine may take the form of electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section, which in turn can comprise random access memory; read only memory; an application memory, a non-transitory computer readable medium which stores, e.g., coded non instructions which can be executed by the processor to perform acts described herein; and any other memory such as cache memory, for example. Another example platform suitable is that of a hardware circuit, e.g., an application specific integrated circuit, ASIC, wherein circuit elements are structured and operated to perform the various acts described herein.

An advantage of at least some of the embodiments described is that device-related information that is related to a certain geographical area may be transmitted to a communication device depending on the location of the communication device independent of which communication protocol the communication device uses for communicating with its device manager server.

By dynamically assigning the device to different groups based on and location information it is possible to achieve any of the following exemplary advantages: Automatically download an application, e.g. city guide, to the device when entering a certain area. Automatically enable Wi-Fi with correct configuration when the communication device enters a hotspot area. Locking of a communication device to a geographic area so that if the communication device changes location a configuration rule is applied so that the communication device cannot be used anymore.

Statistic information about communication device location for different device models is also a valuable business intelligence function where marketing can see the location of different communication device models and from this information create targeted marketing campaigns.

Except for XMPP, other presence protocols may be used, as mentioned. One such presence protocol is the session initiation protocol for instant messaging and presence leveraging extensions, SIMPLE, which is an instant messaging and presence protocol suite based on Session Initiation Protocol, SIP, managed by the Internet Engineering Task Force, IETF.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a network node for managing device-related data to be distributed to a communication device in a communication network, the method comprising:
receiving location information of the communication device from a presence protocol server, wherein the location information is received over a presence protocol;
receiving a device identification for identifying the communication device, wherein the device identification is received over the presence protocol, and wherein the received device identification is a presence-protocol device identification;
determining a network node device identification based on the received presence-protocol device identification;
selecting device-related data for the communication device based on the received device location information; and
transmitting the selected device-related data to the communication device according to the received device identification, wherein the transmitting of the selected device-related data to the communication device is performed according to the determined network node device identification.

2. The method according to claim 1, wherein the selected device-related data is transmitted to the communication device over a device management protocol.

3. The method according to claim 1, wherein the presence protocol server is an Extensible Messaging and Presence Protocol, XMPP, server, and the presence protocol is XMPP.

4. The method according to claim 1, further comprising defining a number of location groups, wherein each location group is connected with geographical information defining a certain geographical area, and wherein the device-related data is connected to each location group, and wherein the selecting of the device-related data for the communication device based on the received device location information comprises:
comparing the received device location information with the geographical information connected with each location group;
selecting a location group or groups of the number of location groups for which the geographical information matches the received device location information; and
selecting the device-related data for the selected location group or groups.

5. The method according to claim 1, further comprising:
transmitting a subscription message to the presence protocol server for subscribing to the location information for the communication device.

6. The method according to claim 1, wherein the location information of the communication device received from the presence-protocol server originates from the communication device.

7. A network node configured for managing device-related data to be distributed to a communication device in a communication network, the network node comprising:

a receiving unit configured to receive location information of the communication device from a presence protocol server, wherein the location information is received over a presence protocol, the receiving unit further being configured to receive a device identification for identifying the communication device, wherein the device identification is received over the presence protocol, and wherein the received device identification is a presence-protocol device identification;

a determining unit configured to determine a network node device identification based on the received presence-protocol device identification;

a selecting unit configured to select device-related data for the communication device based on the received location information of the communication device; and a transmitting unit configured to transmit the selected device-related data to the communication device according to the received device identification, wherein the transmitting unit is further configured to transmit the selected device-related data to the communication device according to the determined network node device identification.

8. The network node according to claim 7, wherein the transmitting unit is configured to transmit the selected device-related data to the communication device over a device management protocol.

9. The network node according to claim 7, wherein the presence protocol server is an Extensible Messaging and Presence Protocol, XMPP, server, and the presence protocol is XMPP.

10. The network node according to claim 7, wherein a number of location groups are defined, each location group being connected with geographical information defining a certain geographical area, wherein the device-related data is connected to each location group, and wherein the selecting unit is configured to:

select the device-related data for the communication device based on the received device location information implying the selecting unit is arranged to compare the received device location information with the geographical information connected with each location group;

select a location group or groups of the number of location groups for which the geographical information matches the received device location information; and select the device-related data for the selected location group or groups.

11. The network node according to claim 7, wherein the transmitting unit is further configured to transmit a subscription message to the presence protocol server for subscribing to the location information for the communication device.

12. The network node according to claim 7, wherein the location information of the communication device received by the receiving unit from the presence-protocol server originates from the communication device.

13. A method performed by a communication device for communicating with a network node in a communication network, the method comprising:

transmitting a device identification to a presence protocol server for identifying the communication device, for further delivery to the network node, wherein the communication device is equipped with a presence protocol client, and wherein the device identification is a presence protocol device identification;

configuring the presence protocol client with the transmitted presence protocol device identification, wherein the transmitted presence protocol device identification corresponds to a network node device identification used at the network node;

transmitting location information of the communication device to the presence protocol server over a presence protocol, for further delivery to the network node; and receiving device-related data of the communication device from the network node according to the transmitted presence protocol device identification, wherein the device-related data has been selected for the communication device based on the transmitted device location information.

14. The method according to claim 13, wherein the device-related data is received over a device management protocol.

15. The method according to claim 13, wherein the presence protocol server is an Extensible Messaging and Presence Protocol, XMPP, server, and the presence protocol is XMPP.

16. A communication device configured for communicating with a network node in a communication network, the communication device comprising:

a transmitting unit configured to transmit a device identification to a presence protocol server for identifying the communication device, for further delivery to the network node, and the transmitting unit further configured to transmit location information of the device to the presence protocol server over a presence protocol, for further delivery to the network node, wherein the device identification is a presence protocol device identification;

a presence protocol client;

a configuring unit for configuring the presence protocol client with the transmitted presence protocol device identification, wherein the transmitted presence protocol device identification corresponds to a network node device identification used at the network node; and a receiving unit configured to receive device-related data of the communication device from the network node according to the transmitted presence protocol device identification, wherein the device-related data has been selected for the communication device based on the transmitted device location information.

17. The communication device according to claim 16, wherein the receiving unit is configured to receive the device-related data over a device management protocol.

18. The communication device according to claim 16, wherein the presence protocol server is an Extensible Messaging and Presence Protocol, XMPP, server, and the presence protocol is XMPP.

19. A non-transitory computer-readable medium storing a computer program comprising program instructions that when run in a network node configures the network node to:

receive location information of a communication device from a presence protocol server, wherein the location information is received over a presence protocol;

receive a device identification for identifying the communication device, wherein the device identification is received over the presence protocol, and wherein the received device identification is a presence-protocol device identification;

determine a network node device identification based on the received presence-protocol device identification;

select device-related data for the communication device based on the received device location information; and transmit the selected device-related data to the communication device according to the received device identification, wherein the transmitting of the selected device-related data to the communication device is performed according to the determined network node device identification.

\* \* \* \* \*